(12) United States Patent
Shao

(10) Patent No.: US 7,370,193 B2
(45) Date of Patent: May 6, 2008

(54) COMPUTING SYSTEM BEING ABLE TO QUICKLY SWITCH BETWEEN AN INTERNAL AND AN EXTERNAL NETWORKS AND A METHOD THEREOF

(76) Inventor: Tong Shao, Sie.& Tech. Enterprising Center, No.88 Shengtai Rd., Jiangning Economic & Technical Development Zone, Nanjing Jiangsu (211100) (CN)

( * ) Notice: Subject to any disclaimer, the term of this patent is extended or adjusted under 35 U.S.C. 154(b) by 824 days.

(21) Appl. No.: 10/693,225

(22) Filed: Oct. 24, 2003

(65) Prior Publication Data

US 2004/0103304 A1    May 27, 2004

(51) Int. Cl.
    *G06F 9/00*    (2006.01)
(52) U.S. Cl. .................. 713/100; 710/260; 710/264; 380/257; 726/26
(58) Field of Classification Search ............... 713/100; 710/260, 264; 380/287, 257; 726/26
    See application file for complete search history.

(56) References Cited

U.S. PATENT DOCUMENTS 4,881,228 A * 11/1989 Shouda ................... 714/38
5,138,305 A * 8/1992 Tomiyasu ................ 345/3.1
5,276,863 A * 1/1994 Heider .................... 709/222
5,493,659 A * 2/1996 Kurakazu et al. ......... 712/244
5,963,738 A * 10/1999 Yamaki et al. ........... 713/100
6,401,154 B1 * 6/2002 Chiu et al. ............... 710/260
6,715,016 B1 * 3/2004 Ohno et al. .............. 710/260

* cited by examiner

*Primary Examiner*—Nasser Moazzami
*Assistant Examiner*—Shanto M Z Abedin
(74) *Attorney, Agent, or Firm*—Raymond Y. Chan; David and raymond Patent Firm

(57) ABSTRACT

The invention discloses a computing system such as a computer, a Personal Digital Assistant, or a mobile phone, being connected both to an internal network and an external network and being able to quickly and safely switch therebetween without being shut down while ensuring a physical separation between the two networks. When a user inputs a request of switching, a switching unit will set a trigger thereof and generate a consequent non-maskable interrupt to CPU. After receives the NMI, the CPU controls the switching unit to run a switch program kept therein to back up a current status of the system. Then the switch program backs up a current status, controls the switching unit to interrupt all serving programs and loads the other status other than the current status to the computing system, and finally control the switching unit to reset the trigger.

3 Claims, 1 Drawing Sheet

COMPUTING SYSTEM BEING ABLE TO QUICKLY SWITCH BETWEEN AN INTERNAL AND AN EXTERNAL NETWORKS AND A METHOD THEREOF

BACKGROUND OF THE PRESENT INVENTION

1. Field of Invention

The invention relates to a computing system such as a computer, a Personal Digital Assistant, or a mobile phone, and more particularly, to the computing system being accessible to both an internal network and an external network and being able to quickly and switch therebetween without being shut down.

1. Description of Related Arts

At present, in consideration of information security, an internal network such as an office or a confidential Local Area Network, is usually physically separated from external network such as the Internet. Some home PCs having private data also need physical separation from the external network. The earliest predecessor solution to this problem was using two computers respectively connected to internal and external networks. Bringing high security however requiring two computers, it is too expensive and can not efficiently exchange data between the internal and the external networks. A later resolution was the dual-mainboard solution. Though uses a common computer chassis and shares one display and one keyboard, it still employs two computers essentially. It has the same problem as its ancestors.

Latterly, dual hard disk and then single hard disk solutions came up. The first one means that two hard disks are used by one computer. When using the internal network, a computer boots up with an "internal use only" hard disk and when it needs to be connected to the external network, a user can boot from the other hard disk connected and used by external network only. In this situation, once the external network is started up, the hard disk or network connected to the internal network is physically separated, i.e. the internal system is absolutely not accessible or at least is not able to be effectively read from or written on. Thus, a user is able to use either the internal system or the external system with one computer, with the physical separation of the internal and the external networks and consequent security of the internal data.

Although the solution of dual hard disk securely separated the internal and external networks, it requires two hard disks, which still costs relative high. In the single hard disk solution, the hard disk is divided into two partitions, each having its own operating system used independently by the internal or external network, respectively. A user can choose to boot either, the internal or the external network. In this solution, when the computer is connected to the external network, data of the internal network is not readable and/or writable and more than one operating systems need to be started up, as disclosed in the patented Chinese invention ZL 94,111,461 owned by the same inventor. When more than one operating systems need to be started up, a good way is "twice startup" disclosed in Chinese patent ZL 97,116,855 of the same inventor. At the same time, the single hard drive solution also successfully solves the problem of system recovery when the system collapses. Additionally, in the solution, a swap area is established on the hard disk, which can be read from or written on when the external network is started up, or can be read from however without being written on when the internal is started up. Information is allowed to flow one-way from the external network to the internal, preventing any automatic disclosure of the internal data. The swap area can be arranged to be readable and writable at any time, which will sacrifice certain security performance. Generally, data exchanges between the internal and the external networks can be done flexibly and safely, keeping a secured separation is always desirable.

However, for either the single hard disk solution or the dual hard disk solution, if a user wants to switch between the internal and the external systems, the computer must be rebooted for purpose of security. It is obviously very inconvenient for users. Especially in e-business, a user frequently needs to communicate and exchange information with other external network users via the external network. And when he needs a digital signature, he may hope to enter the internal network where the signature key is placed to prevent any ill-willed hacker from getting it. After the information is safely signed, the user needs to come back into the external system to exchange the information with other relevant external network users. In that way, programs and keys for signature are kept in the internal system to ensure their security, and can be used in e-commerce while security is guaranteed.

The most important issue in the Internet-based e-commerce is security. At client terminals, due to non-one-hundred-percent virus protection, ill-willed hacker invasions, and BOs, there exists the possibility for the information in client terminal computers to be illegally accessed. However, it is unaffordably serious if the information of a key used for digital signature, which is used to identify clients and sign contracts, is so accessed. It means the information of the key must be kept at an inaccessible place. An U.S. Pat. No. 99,806,523 filed on May 13, 1999 by Wave Systems Corp. disclosed a solution that employs a special-use computer for digital signature. But the computer, e.g. a smart card, either works slowly or is expensive, which makes the users have to choose encryption algorithms having relatively weaker security performance. Therefore, the best way is to make full use of the computer at client terminal, making it 1. be able to physically separate the internal and the external systems, making any internal system information inaccessible from any program and individual including the user he himself; 2. when the computer is connected to internal network, the user can selectively send relevant information to the external system, and in order to ensure security, the control program will not be able to be changed by any virus: it should be write-protected; and, 3. the switching between the internal and the external systems should be conveniently and quickly.

The spirit of the invention for above mentioned computer can be applied to all computing devices such as the portable computing devices. A user may access the external network when internet communication is needed. When digital signature is needed, the user can enter the internal system, and then send documents bearing digital signatures to the expected destinations via external network.

A computer which is able to "simultaneously" use two operating systems will also provide convenience for computer education on multiple operating systems.

SUMMARY OF THE PRESENT INVENTION

The main object of the invention is to provide a computing system such as a computer, a Personal Digital Assistant, or a mobile phone, being accessible to both an internal network and an external network and being able to quickly switch therebetween without being shut down while ensuring a physical separation between above two networks.

These and other objectives, features, and advantages of the present invention will become apparent from the following detailed description, the accompanying drawings, and the appended claims.

DETAILED DESCRIPTION OF THE PREFERRED EMBODIMENT

Figure 1:
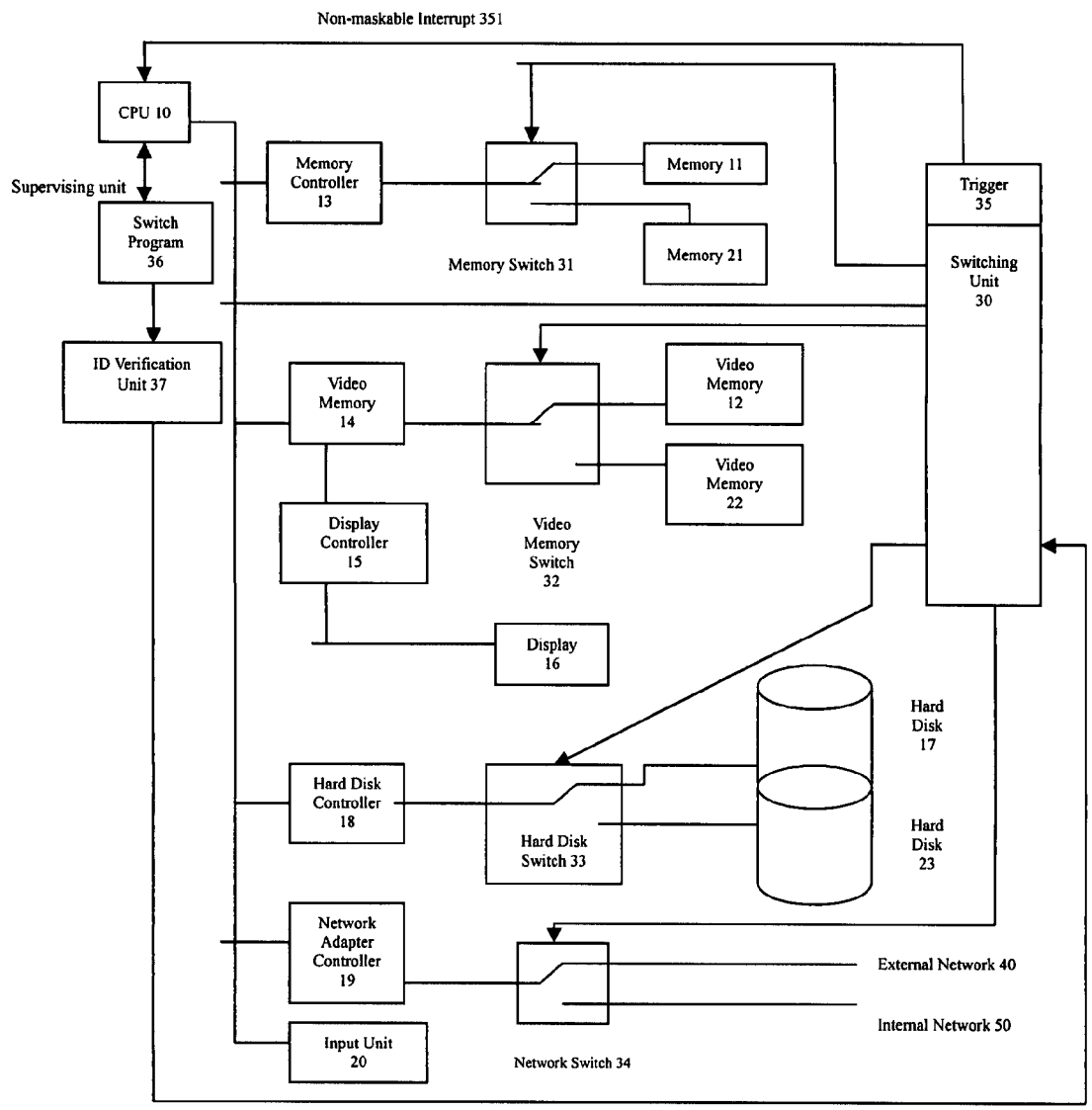
FIG. 1 is a schematic flow chart showing operation of the computing system according to the invention.

For computing systems that are communicatively connected to both an internal network and an external network and that need physical separation and switching between the networks, a usually used conventional way is to reboot the computing system, select a hard disk corresponding to the desired network and having an independent operating system, and enter the operating system to work. A drawback of such a way is slowness which is very unsuitable for some circumstances that need quick switching.

In one aspect, a computing system consisting of clock, logic execution unit, and all variable registers can be theoretically deemed as a system of status. A state of all current variable registers defines a status of a computing system. For example, a state defined by all the variable registers when a computing system only has an internal network connection and one corresponding operating system defines a status of such computing system; and another state defined by the same all registers when the same computing system only has an external network connection and one corresponding operating system defines another status thereof.

So it is considered that if statuses of a computing system can be backed up and recovered, and can be quickly switched therebetween without being shut down while ensuring a physical separation, it will bring much convenience to computing system users.

With reference to FIG. 1, operation of a computing system according to the invention is shown. The computing system has:

a CPU 10 communicatively connected to a memory controller 13, a video memory controller 14, a hard disk controller 18, and a network adapter controller 19, each of which respectively and communicatively connected to a memory 11, a video memory 12, a hard disk 17, and a network unit connected either to an external network 40 or to an internal network 50, respectively through a memory switch 31, a video memory switch 32, a hard drive switch 33, and a network switch 34;

an input unit 20 which is able to input a request of switching to the CPU 10;

a first status thereof defined by states of all variable registers thereof when the computing system is only connected to the internal network 50 and runs one corresponding operating system;

a second status thereof defined by states of the same all registers when the computing system is only connected to the external network 40 and runs another corresponding operating system;

a switching unit 30 being communicatively connected to the CPU 10 and all above switches 31, 32, 33, and 34, respectively, and having a trigger 35 which is able to generate a non-maskable interrupt 351 to the CPU 10 after the switching unit 30 receives a command of switching from the CPU 10 responding to the request of switching; and, a switch program 36 which is kept in the switching unit 30, which has backups of both the statuses in the hard disk, the memory, or a network server, and which, after the CPU 10 receives the non-maskable interrupt 351, is able to backup a current status, control the switching unit 30 to control all the switches 31, 32, 33, and 34 to interrupt all serving programs, then load the other status other than the current status to the computing system, and finally control the switching unit 30 to reset the trigger 35.

The input unit 20 may include a keyboard, a mouse, a touch screen, an E-mail, or other information receiver. The switches 31, 32, 33, and 34 can be either electronic switches or mechanical switches.

A monitor 16 is communicatively connected to the video memory controller 14 through a display controller 15 for monitoring operation of the computing system.

After a switching, all variables in the CPU 10, the memory 11, the video memory 12, the hard disk 17, and all the variable registers of the computing system defining a status of the computing system are changed into the other variables defining the other status. Thus the memory 11, the video memory 12, and the hard disk 17 can be virtually deemed respectively as another identical memory 21, another video memory 22, and another hard disk 23 specially used under either one status.

The switch program 36 may have an ID verification unit 37 thereof used to confirm a validity of the user, and making the switching unit 30 either to proceed or stop respectively when the identification is passed or failed. From above disclosure, it could be seen that the computing system is able to be a computer, a Personal Digital Assistant, or a mobile phone, each of which has all the features and characteristics defined by the aforementioned computing system. The computing system includes a supervising unit being able to monitor an execution process of the switch program running in the CPU, and allow the switch program to proceed if the supervising unit confirms the process has always been in a script of the switch program, or prohibit the switch control unit from any action if the supervising unit fails to confirm.

The invention further provide a method of safely and quickly switching between an internal network 50 and an external network 40 for a computing system having a CPU 10, a first status, a second status, an input unit 20, a switching unit 30 having a trigger 35, and, a switch program 36, wherein the method comprises following steps:

1) input a request of switching via the input unit 20 when the computing system is in one of the two statuses;

2) after receiving the request of switching, the CPU 10 runs the switch program 36; and, 3) the switch program 36 backs up a current status, control the switching unit 30 to interrupt all serving programs and loads the other status other than the current status to the computing system.

Alternatively, the step 2) of above process may be:

2.1) after receiving the request of switching, the CPU sends a command of switching to the switching unit;

2.2) the switching unit sets the trigger which generates a consequent non-maskable interrupt back to the CPU;

2.3) after and only after receives the non-maskable interrupt 351, the CPU 10 runs the switch program 36.

In above method, a further sub-step (3.1) may be added into (3) wherein before the switch program 36 starts backing-up the data, a further confirmation of a judging unit 37 is required.

In the above disclosed invention, it could be apparent to a person of related art that no matter which status the computing system is currently in, the computing system is able to be absolutely disconnected from any network 40 or 50 either physically or with software whenever desired by a user.

One skilled in the art will understand that the embodiment of the present invention as shown in the drawings and described above is exemplar only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A computing system comprising:
   a CPU communicatively connected to a memory controller being communicatively connected to a memory connected either to an external operating system or to an internal operating system, through a switching unit;
   an input unit that is able to input a request of switching;
   a first status thereof defined by states of all variable registers thereof when said computing system is only connected to said internal operating system;
   a second status thereof defined by states of said all variable registers when said computing system is only connected to said external operating system;
   a switching unit being communicatively connected to said CPU and all said switches, respectively, has backups of both said statuses, and is able to backup a current status, control said general switch to control all said switches to interrupt all serving programs, then load the other status other than said current status to the computing system, wherein said switching unit has a trigger that is able to generate a non-maskable interrupt to said CPU after said switching unit receives a command of switching from said CPU responding to said request of switching, wherein a switch program is kept in said switching unit, and which has backups of both said statuses, and which, after said CPU receives said non-maskable interrupt, is able to backup a current status, control said general switch to control all said switches to interrupt all serving programs, then load the other status other than said current status to the computing system, and finally control said switching unit to reset said trigger; and
   a supervising unit being able to monitor an execution process of said switch program running in said CPU, and allow said switch program to proceed if said supervising unit confirms said process has always been in a script of said switch program, or prohibit said switch control unit from any action if said supervising unit fails to confirm.

2. A computing system comprising:
   a CPU communicatively connected to a memory controller being communicatively connected to a memory connected either to an external operating system or to an internal operating system, through a switching unit;
   an input unit that Is able to input a request of switching;
   a first status thereof defined by states of all variable registers thereof when said computing system is only connected to said internal operating system;
   a second status thereof defined by states of said all variable registers when said computing system is only connected to said external operating system;
   a switching unit being communicatively connected to said CPU and all said switches, respectively, has backups of both said statuses, and is able to backup a current status, control said general switch to control all said switches to interrupt all serving programs, then load the other status other than said current status to the computing system, wherein said switching unit has a trigger that is able to generate a non-maskable interrupt to said CPU after said switching unit receives a command of switching from said CPU responding to said request of switching, wherein a switch program is kept in said switching unit, and which has backups of both said statuses, and which, after said CPU receives said non-maskable interrupt, is able to backup a current status, control said general switch to control all said switches to interrupt all serving programs, then load the other status other than said current status to the computing system, and finally control said switching unit to reset said trigger, wherein said switch program has an ID verification unit thereof used to confirm a validity of a user, and making said switching unit either to proceed or stop respectively when identification is passed or failed.

3. A method of safely and quickly switching between an internal operating system and an external operating system for a computing system having a CPU, an input unit, a first status defined by states of all variable registers thereof when said computing system is only connected to said internal operating system, a second status defined by states of said all variable registers when said computing system is only connected to said external operating system, a switching unit, and, a switch program, wherein said method comprises following steps:
   (1) inputting a request of switching via said input unit when said computing system is in one of said first and second statuses;
   (2) after receiving said request of switching, running said CPU said switch program; and
   (3) backing up said switch program a current status, control said switching unit to interrupt all serving programs and loading the other status other than said current status to the computing system, wherein said switching unit has a trigger that is able to generate a non-maskable interrupt to said CPU after said switching unit receives a command of switching from said CPU responding to said request of switching, wherein said step (3) is that said supervising unit monitors an execution process of said switch program running in said CPU, and either (3a) allows said switch program to back up a current status, control said switching unit to interrupt all serving programs and loads the other status other than said current status to said computing system, and finally control said switching unit to reset said first trigger if said supervising unit confirms that said process has always been in a script of said switch program, or (3b) prohibit said switch control unit from any action if said supervising unit fails to confirm.

* * * * *